United States Patent [19]
Leifeld

[11] Patent Number: 5,815,890
[45] Date of Patent: Oct. 6, 1998

[54] APPARATUS FOR MEASURING THE THICKNESS OF A RUNNING SLIVER IN A SLIVER PRODUCING MACHINE

[75] Inventor: Ferdinand Leifeld, Kempen, Germany

[73] Assignee: Trützschler GmbH & Co. KG, Mönchengladbach, Germany

[21] Appl. No.: 728,971

[22] Filed: Oct. 11, 1996

[30] Foreign Application Priority Data

Oct. 12, 1995 [DE] Germany .................. 195 37 983.7

[51] Int. Cl.⁶ .................................................. D01H 5/32
[52] U.S. Cl. ................................................. 19/288; 19/150
[58] Field of Search .............................. 19/23, 288, 290, 19/291, 292, 150, 157; 73/159, 160

[56] References Cited

U.S. PATENT DOCUMENTS

| | | |
|---|---|---|
| 3,822,590 | 7/1974 | Tharpe et al. . |
| 4,763,387 | 8/1988 | Bothner ........................... 19/288 |
| 4,809,405 | 3/1989 | Bruderlin et al. .............. 19/159 R |
| 4,949,431 | 8/1990 | Gasser ............................ 19/150 |
| 5,018,246 | 5/1991 | Leifeld ........................... 19/150 |
| 5,461,757 | 10/1995 | Leifeld ........................... 19/150 |
| 5,544,390 | 8/1996 | Hartung et al. .................. 19/240 |
| 5,615,453 | 4/1997 | Leifeld ........................... 19/288 |
| 5,619,772 | 4/1997 | Leifeld ........................... 19/240 |

FOREIGN PATENT DOCUMENTS

| | | |
|---|---|---|
| 21 38 855 | 5/1974 | Germany . |
| 23 58 941 | 2/1976 | Germany . |
| 44 04 326 | 10/1994 | Germany . |
| 685506 | 7/1995 | Switzerland . |
| 2 277 106 | 10/1994 | United Kingdom . |
| 87/04472 | 7/1987 | WIPO . |

Primary Examiner—Michael A. Neas
Attorney, Agent, or Firm—Spencer & Frank

[57] ABSTRACT

An apparatus for measuring the thickness of running sliver includes a body having inner walls defining a funnel-shaped cavity through which the sliver passes; a contact finger having an end portion for contacting the running sliver at the narrow end of the cavity; a support arrangement for movably securing the contact finger to the body; a device for urging the end portion of the contact finger into resilient contact with the running sliver for pressing the running sliver against a stationary component at the narrow end of the contact finger, whereby the contact finger performs excursions in response to thickness variations of the running sliver; and a transducer connected with the contact finger to transform displacements thereof into electrical signals. There is further provided an air stream generating arrangement for driving an air stream through the space which accommodates the contact finger, whereby the contact finger is exposed to the air stream.

3 Claims, 2 Drawing Sheets

APPARATUS FOR MEASURING THE THICKNESS OF A RUNNING SLIVER IN A SLIVER PRODUCING MACHINE

CROSS REFERENCE TO RELATED APPLICATION

This application claims the priority of German Application No. 195 37 983.7 filed Oct. 12, 1995.

BACKGROUND OF THE INVENTION

This invention relates to an apparatus adapted to be incorporated in a fiber processing machine, particularly a drawing frame, and serves for measuring the thickness of the sliver. The apparatus is essentially composed of a body defining a funnel-shaped cavity through which the sliver passes. The body is situated immediately upstream of a sliver-withdrawing roller pair. The measuring values generated by the apparatus are applied to control devices. The body has a recess at the narrow, outlet end of the funnel-shaped cavity for receiving an inwardly biased, movable member (contact finger) whose inner end, in cooperation with an oppositely lying wall portion of the body, forms a constricted part for the throughgoing sliver. The change of position of the movably supported member in response to thickness variations of the running sliver applies mechanical signals to a transducer which, in turn, generates electrical control pulses.

An apparatus of the above-outlined type is disclosed in German Offenlegungsschrift (application published without examination) No. 23 58 941. It is a disadvantage of the structure described therein that during operation, in the region of the sliver contacting part of the movable component, dust, fiber fly, trash and other impurities may accumulate.

SUMMARY OF THE INVENTION

It is an object of the invention to provide an improved apparatus of the above-outlined type from which the discussed disadvantage is eliminated and in which, in particular, the accumulation of dust, fiber fly, trash and the like is prevented.

This object and others to become apparent as the specification progresses, are accomplished by the invention, according to which, briefly stated, the apparatus for measuring the thickness of running sliver includes a body having inner walls defining a funnel-shaped cavity through which the sliver passes; a contact finger having an end portion for contacting the running sliver at the narrow end of the cavity; a support arrangement for movably securing the contact finger to the body; a device for urging the end portion of the contact finger into resilient contact with the running sliver for pressing the running sliver against a stationary component at the narrow end of the contact finger, whereby the contact finger performs excursions in response to thickness variations of the running sliver; and a transducer connected with the contact finger to transform displacements thereof into electrical signals. There is further provided an air stream generating arrangement for driving an air stream through the space which accommodates the contact finger, whereby the contact finger is exposed to the air stream.

By virtue of the fact that an air stream flows along the region of the contact portion of the movable member (contact finger), a deposition or accumulation of impurities is prevented. The air stream, particularly a high velocity air stream, blows back dust and the like which seeks to penetrate into the chamber which, among others, accommodates the measuring transducer such as an inductive path sensor. The air stream ensures that the transducer is not soiled by impurities. Advantageously, the air stream further serves as a coolant for the contact finger which may be heated to temperatures of up to 400° C. as a result of the friction with the fast-running sliver attaining speeds of, for example, 1000 m/min and over. Further, the transducer is also cooled by the air stream.

DESCRIPTION OF THE PREFERRED EMBODIMENT

Figure 1:
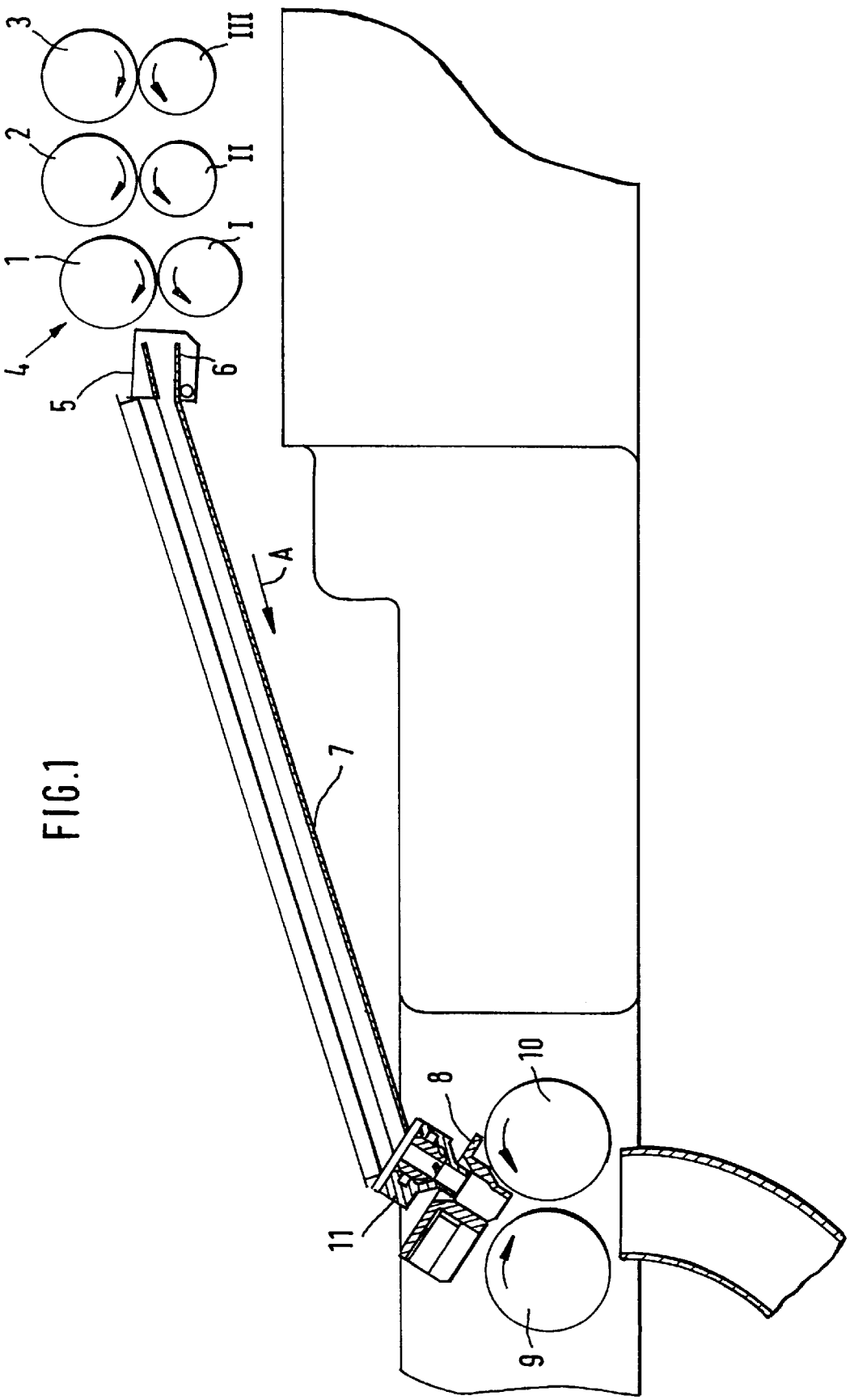
FIG. 1 is a schematic side elevational view of a drawing unit of a drawing frame, including a sliver gathering and guiding element and a sliver trumpet at the exit of the drawing frame.

The construction shown in FIG. 1 represents a 3-over-3 drawing unit 4 of a drawing frame which may be, for example, an HSR model high-performance drawing frame manufactured by Trützschler GmbH & Co. KG, Mönchengladbach, Germany. The drawing unit 4 is composed of a lower output roll I, a lower center roll II, a lower input roll III, as well as three upper rolls 1, 2 and 3, cooperating, respectively, with the lower rolls I, II and III. The roll pairs 3/III and 2/II constitute a pre-drawing zone, whereas the roll pairs 2/II and 1/I constitute a principal drawing zone. At the outlet of the drawing unit 4 a gathering element 5 with a funnel-shaped passage 6 is provided for causing a plurality of parallel-running, drawn slivers to converge and form a sliver assembly. Downstream of the collecting element 5 a transfer element 7 is provided for guiding the sliver assembly in the direction A from the gathering element 6 to a sliver trumpet 8. The transfer element 7 is inclined downwardly in the direction of the sliver trumpet 8. Two withdrawing rolls 9 and 10 pull the densified sliver assembly through the sliver trumpet 8 at high speed. Between the transfer element 7 and the sliver trumpet 8 a swirling nozzle 11 is situated for an initial tread-in of the sliver assembly into the sliver trumpet 8.

Figure 2:
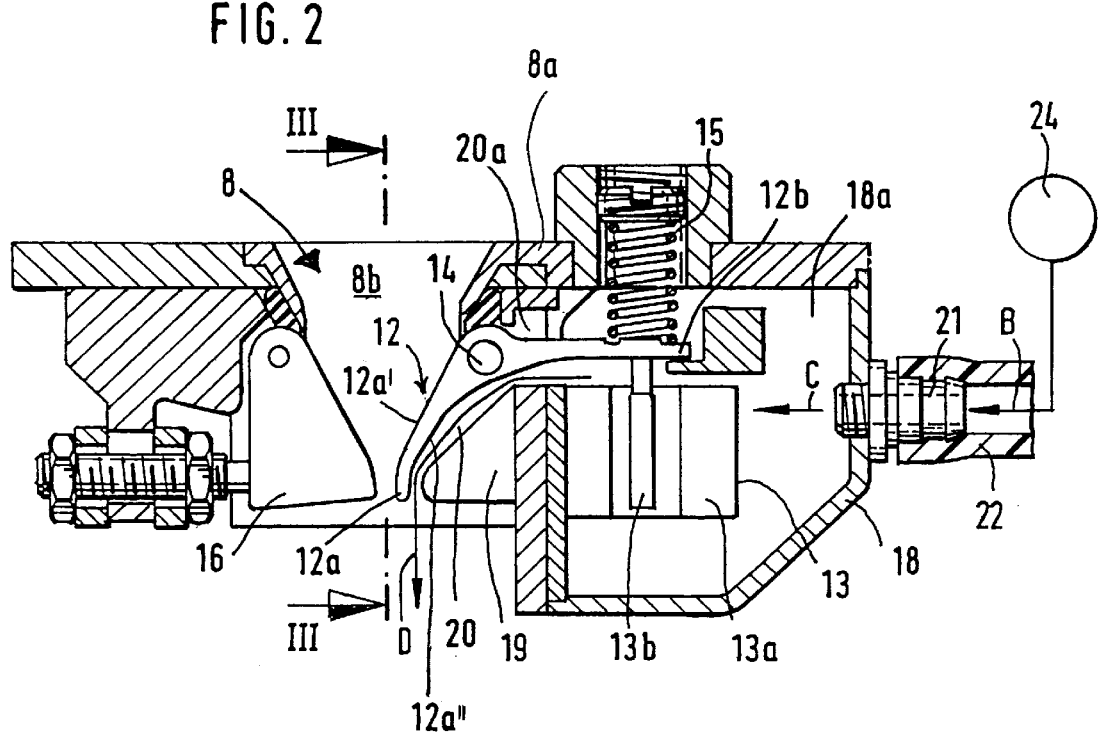
FIG. 2 is a sectional side elevational view of a preferred embodiment of the invention.

FIG. 2 illustrates the apparatus which is incorporated in a drawing frame and which serves for measuring the thickness of a sliver assembly. The apparatus essentially is formed of the sliver trumpet 8 formed of a multipart body 8a defining a funnel-shaped cavity 8b surrounding the running sliver assembly. The sliver trumpet 8 is situated immediately upstream of a withdrawing roll pair 9, 10.

Figure 3:
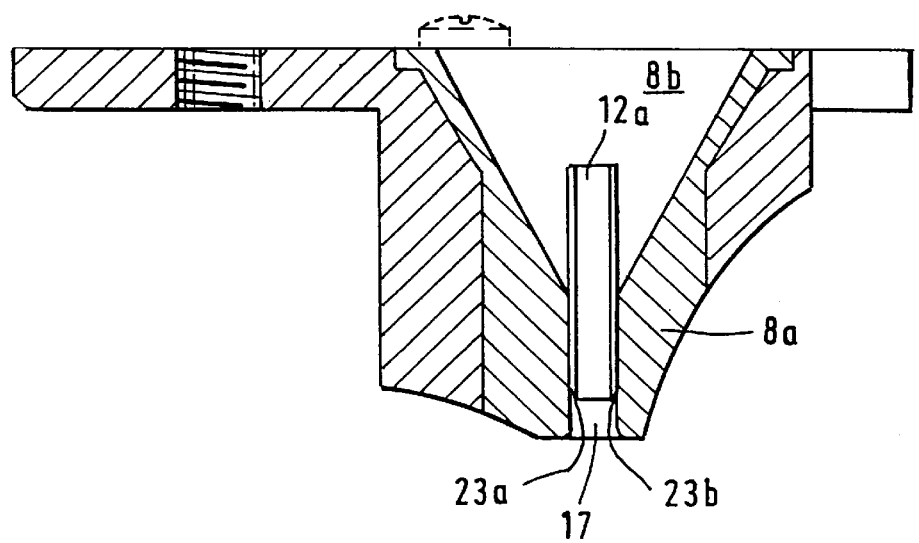
FIG. 3 is a sectional view taken along line III—III of FIG. 2.

A contact finger 12 is pivotally secured to the trumpet body 8a by means of a bearing 14 which divides the contact finger 12 into an arm 12a situated in the funnel-shaped cavity 8a and an arm 12b situated in a chamber 18a defined by a housing 18 adjoining the sliver trumpet 8. The contact finger 12 passes through an aperture 21a which connects the chamber 18a with an intermediate space 20 bounded by the arm 12a of the contact finger 12 and a stationary abutment 19 secured to the trumpet body 8a and cooperating with the arm 12a. The terminus of the arm 12a of the contact finger 12 is in a direct, frictional engagement with the running sliver assembly and forms a constriction therefor in cooperation with an adjustable, but operationally stationary counterelement 16 (constituting a wall portion of the sliver trumpet 8). The counterelement 16 projects through a non-illustrated slot provided in the wall face defining the funnel-shaped cavity 8b. The arm 12b of the contact finger 12 is exposed to the resilient force of a coil spring 15 disposed in the chamber 18a, whereby the terminus of the arm 12a is urged against the running sliver assembly. The contact finger 12 projects through a slot-like opening 17 provided in the wall face of the sliver trumpet 8 as shown in FIG. 3.

As the thickness of the running sliver assembly changes, the position of the contact finger 12 is altered. Such displacements of the contact finger 12 constitute mechanical signals which are applied to a transducer (inductive path sensor) 13 which is disposed in the chamber 18a and which serves for generating electric control pulses applied to control devices (not shown). The transducer 13 is formed of a plunger coil 13a and a plunger armature 13b affixed to the arm 12b to be movable therewith.

The contact finger 12 and the counterelement 16 are made of a steel-bound hard material, such as ferrotitanite and are thus wear resistant to the frictional effect of the sliver assembly running at high speed through the measuring trumpet 8. The contact finger 12 has a small inertia and reacts rapidly to fluctuations in the sliver thickness.

The housing 18 supports a nipple 21 to which a pressure hose 22 is attached for introducing an air stream from a compressed air source 24 into the chamber 18a as shown by arrows B and C. The compressed air passes through the chamber 18a and then, as shown by the arrow D, traverses the aperture 20a and enters into the intermediate space 20 and eventually leaves the sliver trumpet 8 at the narrow end of the funnel-shaped cavity 8b.

Turning again to FIG. 3, between the contact finger arm 12a and the walls of the sliver trumpet 8 narrow clearances 23a and 23b are provided. The compressed air stream, as it flows past the arm 12a, ensures that the intermediate space 20 as well as the clearances 23a, 23b remain free from fiber fly, dust and the like. At the same time, the air stream cools the transducer 13 and the contact finger 12.

It will be understood that the above description of the present invention is susceptible to various modifications, changes and adaptations, and the same are intended to be comprehended within the meaning and range of equivalents of the appended claims.

What is claimed is:

1. An apparatus for measuring the thickness of running sliver, comprising (a) a body having inner walls defining a funnel-shaped cavity through which the sliver passes; said cavity having a wide end defining a sliver inlet and a narrow end defining a sliver outlet;

(b) a contact finger having an end portion for contacting the running sliver at said narrow end; said contact finger having first and second arms; said second arm being situated in said cavity and having a front surface adapted to contact the running sliver and a rear surface oriented away from said front surface;

(c) means defining a space for accommodating said contact finger; said means defining said space including a housing adjoining said body; said housing forming a chamber constituting a first part of said space; said first arm of said contact finger projecting into said chamber; said rear surface of said contact finger bounding a second part of said space; said second part constituting an intermediate space communicating with said chamber;

(d) support means for movably securing said contact finger to said body; said support means including a pivot bearing angularly movably supporting said contact finger; said first and second arms of said contact finger extending from said pivot bearing;

(e) means for urging said end portion into resilient contact with the running sliver for pressing the running sliver against a stationary component at said narrow end, whereby said contact finger performs excursions in response to thickness variations of the running sliver;

(f) a transducer connected with said contact finger to transform displacements thereof into electrical signals; and (g) air stream generating means for driving an air stream through said space, whereby said contact finger is exposed to the air stream.

2. The apparatus as defined in claim 1; wherein said air stream generating means includes a nipple blowing an air stream into said chamber; further comprising an air outlet communicating with said intermediate space and being situated at said sliver outlet, whereby said air stream, entering said chamber through said nipple, exits said intermediate space at said air outlet while flowing past said first and second arms of said contact finger.

3. The apparatus as defined in claim 1, wherein said transducer is disposed in said chamber and is exposed to said air stream.

* * * * *